United States Patent
Jung et al.

(10) Patent No.: US 9,513,308 B2
(45) Date of Patent: Dec. 6, 2016

(54) MUZZLE VELOCITY MEASURING APPARATUS AND METHOD

(71) Applicant: HANWHA CORPORATION, Seoul (KR)

(72) Inventors: Kyu-Chae Jung, Gumi-si (KR); De-Rac Son, Daejeon-si (KR); Jun-Goo Shin, Daejeon-si (KR); Sung-Min Lee, Daejeon-si (KR); Jung-Yun Kim, Daejeon-si (KR)

(73) Assignee: Hanwha Corporation, Seoul (KR)

( * ) Notice: Subject to any disclaimer, the term of this patent is extended or adjusted under 35 U.S.C. 154(b) by 0 days.

(21) Appl. No.: 14/134,487

(22) Filed: Dec. 19, 2013

(65) Prior Publication Data

US 2014/0182472 A1 Jul. 3, 2014

(30) Foreign Application Priority Data

Dec. 28, 2012 (KR) .................. 10-2012-0157085

(51) Int. Cl.
*G01P 3/80* (2006.01)
*G01P 3/66* (2006.01)
(Continued)

(52) U.S. Cl.
CPC .............. *G01P 3/665* (2013.01); *F41A 21/32* (2013.01); *F42C 9/00* (2013.01); *F42C 11/065* (2013.01); *F42C 17/04* (2013.01)

(58) Field of Classification Search
CPC ........ G01B 7/305; G01B 7/31; G01B 7/312; G01B 7/02; G01B 7/023; G01B 7/04; G01B 7/046; G01B 7/14; F41A 21/32; F41A 19/03; F41A 19/66; F42C 11/065; F42C 17/04; F42C 9/00; F42C 11/00; F42C 11/001; F42C 11/002; F42C 11/06; F42C 13/00; F42C 13/04; F42C 13/042; F42C 13/045; F42C 13/047; F42C 13/08; G01P 3/66; G01P 3/665; G01D 5/2225; G01D 5/2233; G01D 5/2241; G01D 5/225; G01D 5/2258; G01D 5/2266; G01D 5/2275; G01D 5/2283; G01D 5/16; G01D 5/20; G01D 5/2006; G01D 5/2013; G01D 5/202; G01D 5/2026; G01D 5/2033; G01D 5/204; G01D 5/2046; G01D 5/2053; G01D 5/206; G01D 5/22; G01D 5/2208; G01D 5/2216; G01D 5/14; G01D 5/142; G01D 5/145; G01D 5/147; G01R 15/20; G01R 15/202; G01R 15/205
USPC ........................................................ 324/179
IPC ................................... G01P 3/665; F42C 9/00
See application file for complete search history.

(56) References Cited

U.S. PATENT DOCUMENTS 2,400,189 A 5/1946 Carlson et al.
3,787,770 A 1/1974 Cote et al.
(Continued)

FOREIGN PATENT DOCUMENTS

DE 196 23 236 A1 12/1997
EP 0 733 907 A1 9/1996
(Continued)

OTHER PUBLICATIONS

European Search Report issued May 9, 2014 in counterpart European Patent Application No. 13198302.5 (4 pages).

(Continued)

*Primary Examiner* — David M. Schindler
(74) *Attorney, Agent, or Firm* — NSIP Law

(57) ABSTRACT

The present invention relates to an apparatus for measuring a muzzle velocity of a fired bullet so that the bullet may explode at an accurate location. The muzzle velocity measuring apparatus includes a detector configured to comprise a pair of cores encircled by probe wound coils and installed in two separate positions in an adapter, and to output a muzzle velocity signal based on eddy current signals which are generated by the probe wound coils when a bullet fired from a bullet chamber passes through the adapter, a muzzle velocity calculator configured to calculate a flight speed of the fired bullet based on the muzzle velocity signal; and a transmitter configured to transmit the calculated flight speed to the bullet.

5 Claims, 5 Drawing Sheets

(51) Int. Cl.
    *F42C 11/06*     (2006.01)
    *F42C 17/04*     (2006.01)
    *F42C 9/00*     (2006.01)
    *F41A 21/32*     (2006.01)

(56) References Cited

U.S. PATENT DOCUMENTS

| | | | | |
|---|---|---|---|---|
| 4,080,869 | A * | 3/1978 | Karayannis et al. | 89/6.5 |
| 4,649,796 | A * | 3/1987 | Schmidt | 89/6.5 |
| 4,862,785 | A | 9/1989 | Ettel et al. | |
| 6,391,222 | B1 | 5/2002 | Watanabe | |
| 8,433,460 | B1 * | 4/2013 | Recchia et al. | 701/7 |
| 2005/0126380 | A1 | 6/2005 | Ettmuller et al. | |

FOREIGN PATENT DOCUMENTS

| | | |
|---|---|---|
| EP | 1 538 448 A1 | 6/2005 |
| GB | 137875 A | 4/1919 |
| GB | 1 226 149 | 3/1971 |
| GB | 2 202 331 A | 9/1988 |
| JP | 8-271541 A | 10/1996 |
| JP | 08327647 A * | 12/1996 |
| KR | 10-2001-0050934 A | 6/2001 |
| KR | 10-2009-0061892 | 6/2009 |
| KR | 10-0959358 B1 | 5/2010 |

OTHER PUBLICATIONS

European Office Action issued on Aug. 4, 2015 in counterpart European Application No. 13 198 302.5 (6 pages in English).

* cited by examiner

PRIOR ART

MUZZLE VELOCITY MEASURING APPARATUS AND METHOD

CROSS-REFERENCE TO RELATED APPLICATION(S)

This application claims the benefit under 35 U.S.C. §119 (a) of a Korean Patent Application No. 10-2012-0157085, filed on Dec. 28, 2012, in the Korean Intellectual Property Office, the entire disclosure of which is incorporated herein by references for all purposes.

BACKGROUND

1. Field

The following description relates to an apparatus and method for measuring a muzzle velocity of a fired bullet so that the bullet is able to explode at an accurate location.

2. Description of the Related Art

Generally, a mechanical ammunition fuse has an impact function to explode on impact with a target, and a pyrotechnic ammunition fuse has a time function to detonate at a preset time. An electronic fuse has the two functions of both the mechanical ammunition fuse and the pyrotechnic fuse, and also includes a proximity function. Such electronic fuses are used as airburst munitions. For example, if a distance from a target is measured using a laser range finder, a fire control device inputs a time corresponding to the distance or the number of rotation of a bullet to an electronic fuse, so that a fired bullet explodes in the air when it reaches the set distance.

However, an error occurs between a location of the target input in the fire control device and a location at which the air burst munitions actually bursts. In order to correct the error, two methods are usually used: the first method is a method of correcting final location data of a target by measuring a muzzle velocity of a bullet that exits a barrel, and the second method is a method of correcting final location data of a target by measuring the number of rotations of a bullet that rotates at a constant rotational velocity.

Korean Patent Publication No. 10-2009-0061892 discloses a method of correcting a preset time by measuring a fired bullet that exits a barrel. But, a general method of measuring a muzzle velocity leads bullets to be clung to each other since bullets are made of magnets. In addition, a muzzle velocity measuring sensor, such as an induction loop, installed in a barrel consumes a large amount of power, and is less sensitive.

SUMMARY

The following relates to an apparatus and method for measuring an actual flight speed of a fired bullet using eddy current input signals generated by eddy current sensors, which are installed in a barrel.

In one general aspect, there is provided a muzzle velocity measuring apparatus including a detector configured to comprise a pair of cores encircled by probe wound coils and installed in two separate positions in an adapter, and to output a muzzle velocity signal based on eddy current signals which are generated by the probe wound coils when a bullet fired from a bullet chamber passes through the adapter; a muzzle velocity calculator configured to calculate a flight speed of the fired bullet based on the muzzle velocity signal; and a transmitter configured to transmit the calculated flight speed to the bullet.

Each of the cores may be formed in a U-shape and is installed in the adapter to have an open side of the U-shape to face an inner side of the adapter.

The cores may be Mn—Zn ferrite cores.

The muzzle velocity measuring apparatus may further include a receiver installed in the bullet and configured to receive the flight speed of the bullet from the transmitter; and a controller formed in the bullet and configured to control the bullet to explode over a target based on the received flight speed.

The controller may include a memory to store a time of explosion set by a user, and, if the receiver receives the flight speed of the bullet, the controller corrects the time of explosion stored in the memory base on the flight speed, and controls the bullet to explode based on the corrected time of explosion.

In another general aspect, there is provided a muzzle velocity measuring method including outputting a muzzle velocity signal based on eddy current signals which are generated by probe wound coils individually encircling two cores installed at two separate positions in an adapter when a bullet fired from a bullet chamber passes through the adapter; calculating, at a muzzle velocity calculator, a flight speed of the bullet based on the eddy current signals; and transmitting, at a transmitter, the calculated flight speed to the bullet.

Each of the cores may be formed in a U-shape and installed in the adapter to have an open side of the U-shape to face an inside of the adapter.

The muzzle velocity measuring method may further include receiving, at a receiver, the flight speed from the transmitter; and controlling the bullet to explode over a target based on the received flight speed of the bullet.

The controlling of the bullet may include, in response to the receiver receiving the flight speed of the bullet, correcting a preset time of explosion based on the flight speed of the bullet, and controlling the bullet to explode based on the corrected time of explosion.

Other features and aspects may be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
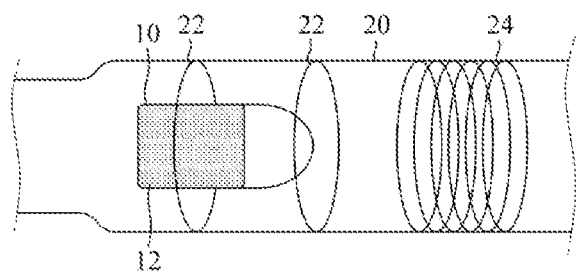
FIG. 1 is a configuration diagram illustrating a general muzzle velocity measuring apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, examples of a muzzle velocity measuring apparatus will be described in detail with reference to relevant drawings.

FIG. 1 is a configuration diagram illustrating a general muzzle velocity measuring apparatus.

Referring to FIG. 1, a general muzzle velocity measuring apparatus includes an adapter 20 mounted to one end of a barrel, and a muzzle velocity measuring sensor 22 and a data transfer coil 24 are formed in the adapter 20.

Generally, an induction loop is used as the muzzle velocity measuring sensor 22. The data transfer coil 24 is a coil-type communication antenna, and, if an actual flight speed, that is, a muzzle velocity, of a bullet 10 fired up from a bullet chamber is calculated, the muzzle velocity is transferred to the bullet 10.

Time information that includes information required to control the bullet 10 to explode is stored in a controller that is included in the bullet 10. When the bullet 10 fired from a bullet chamber passes through the adapter 20, eddy current is generated in the bullet 10 made of metal due to a magnetic field generated by a core of the muzzle velocity measuring sensor 22. As a result, it may lead to a change in inductance of the muzzle velocity measuring sensor 22, and the eddy current passes through a pair of muzzle velocity measuring sensors 22 at a predetermined time interval. At this time, if a muzzle velocity signal about an actual flight speed of the bullet 10 is generated by the muzzle velocity measuring sensor 22, an actual flight speed of the bullet 10 is calculated based on the muzzle velocity signal, and the calculated flight speed of the bullet 10 is transmitted to the bullet 10 through the communicator 24. If the actual flight speed of the bullet 10 is received, the controller of the bullet 10 corrects the explosion time based on the actual flight speed of the bullet 10, and controls the bullet 10 to explode at an accurate location of a target.

However, as a magnet is installed in the bullet 10 in a general muzzle velocity measuring apparatus, ready-to-be-fired bullets 10 cling to each other due to the magnet, resulting in an error in flight speed. In addition, the general muzzle velocity measuring apparatus uses an induction loop as the muzzle velocity measuring sensor 22, which requires large power consumption.

Figure 2:
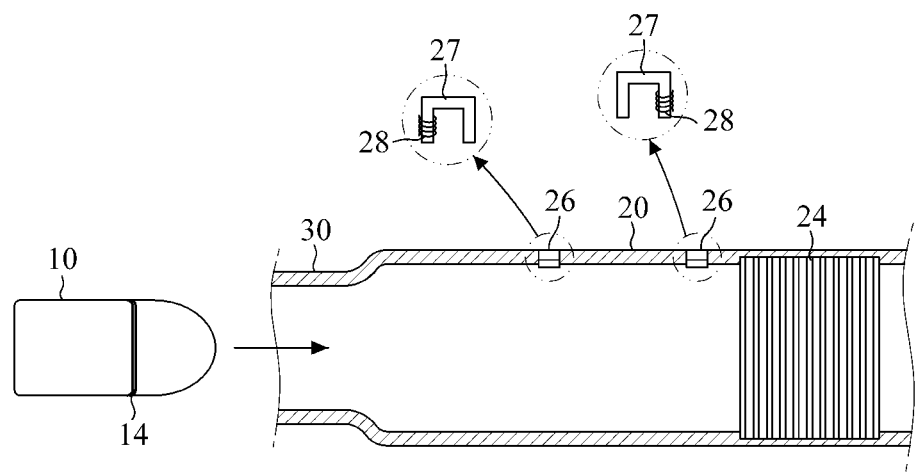
FIG. 2 is a configuration diagram illustrating a muzzle velocity measuring apparatus according to an exemplary embodiment of the present invention.
Figure 3:
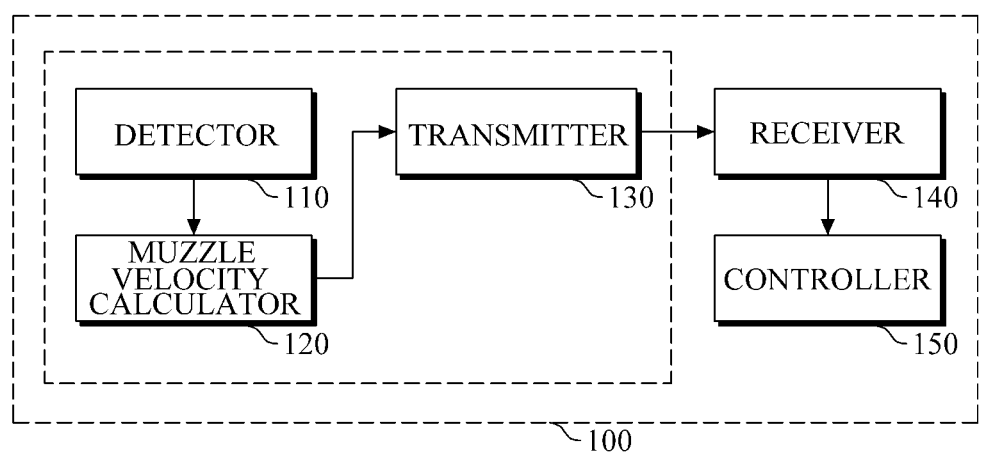
FIG. 3 is a block diagram illustrating a muzzle velocity measuring apparatus according to an exemplary embodiment of the present invention.

FIG. 2 is a configuration diagram illustrating a muzzle velocity measuring apparatus according to an exemplary embodiment of the present invention. FIG. 3 is a block diagram illustrating a muzzle velocity measuring apparatus according to an exemplary embodiment of the present invention.

Hereinafter, in order to solve the drawbacks of a general muzzle velocity measuring apparatus described with reference to FIG. 1, there is provided detailed description about a muzzle velocity measuring apparatus 100 that accurately measures a muzzle velocity using eddy current sensors.

Referring to FIGS. 2 and 3, the muzzle velocity measuring apparatus 100 includes a detector 110, a muzzle velocity calculator 120 and a transmitter 130. The detector 110, the muzzle velocity calculator 120, and the transmitter 130 may be installed in the adapter 20. The adapter 20 may be mounted to one end of a barrel, or may be manufactured as a part of the barrel 30.

The detector 110 may be a pair of eddy current sensors 26 that utilizes a change in inductance of a coil, which is led by eddy current occurring in a conductor. In addition, the detector 110 may include a pair of cores 27 encircled by probe wound coils 28, and installed in two separate positions in the adapter 20 at predetermined intervals.

As shown in FIG. 2, the core 27 may be formed in a U-shape, and may be installed in the adapter 20 to have an open side of the U-shape to face the inside of the adapter 20. This configuration minimizes the effect from the metal outside of the adapter 20. In addition, the core 27 may be an Mn—Zn ferrite core.

When a bullet 10 fired from a bullet chamber passes through the adapter 20, the detector 110 may output a muzzle velocity signal based on eddy current signals which are generated by the probe wound coil 28 at predetermined time intervals.

The muzzle velocity calculator 120 calculates an actual flight speed of the fired bullet 10 based on eddy current signals generated at predetermined time intervals. In general, a flight speed of a bullet 10 may be slightly changed according to various circumstances, for example, a manufacturing environment and a firing environment. Thus, even though a location of and a distance from a target are achieved, it is hard to control the bullet 10 to explode over the target accurately. However, a calculated flight speed of the bullet 10 may be used to correct a preset time of explosion of the bullet, as described in the following.

If an actual flight speed of the bullet 10 is calculated by the muzzle velocity calculator 120, the transmitter 130 transmits the calculated flight speed to the bullet 10. The transmitter 130 may be a coil-type antenna 24, shown in FIG. 2, which is wound up at one end of the adapter 20, and able to communicate with a receiver antenna installed in the bullet 10.

According to another aspect, the muzzle velocity measuring apparatus 100 may further include a receiver 140 and a controller 150. In this case, the receiver 140 and the controller 150 may be installed in the bullet 10.

The receiver 140 receives a muzzle velocity of a flying bullet 10 from the receiver 130 installed in the adapter 20. The receiver 140 may be a coil-type antenna 14 installed in the bullet 10, as shown in FIG. 2.

When the receiver 140 receives a flight speed and/or flight speed information of the bullet 10, the controller 150 controls the bullet 10 to explode over a target based on the flight speed information.

In this case, the controller 150 may include a memory (now shown) to store a time of explosion preset by a user. Specifically, before firing the bullet 10, the user finds out a location of a target, determines a time of explosion of the bullet based on a distance from the target, and sets a time of explosion of the bullet 10 in advance based on the distance from the target. The preset time of explosion may be stored in the memory (not shown). If receiving an actual flight speed of the bullet 10, the controller 150 may correct the time of explosion based on the actual flight speed. In addition, the controller 150 may control the bullet 10 to explode at an accurate location of the target based on the corrected time of explosion.

Figure 4:
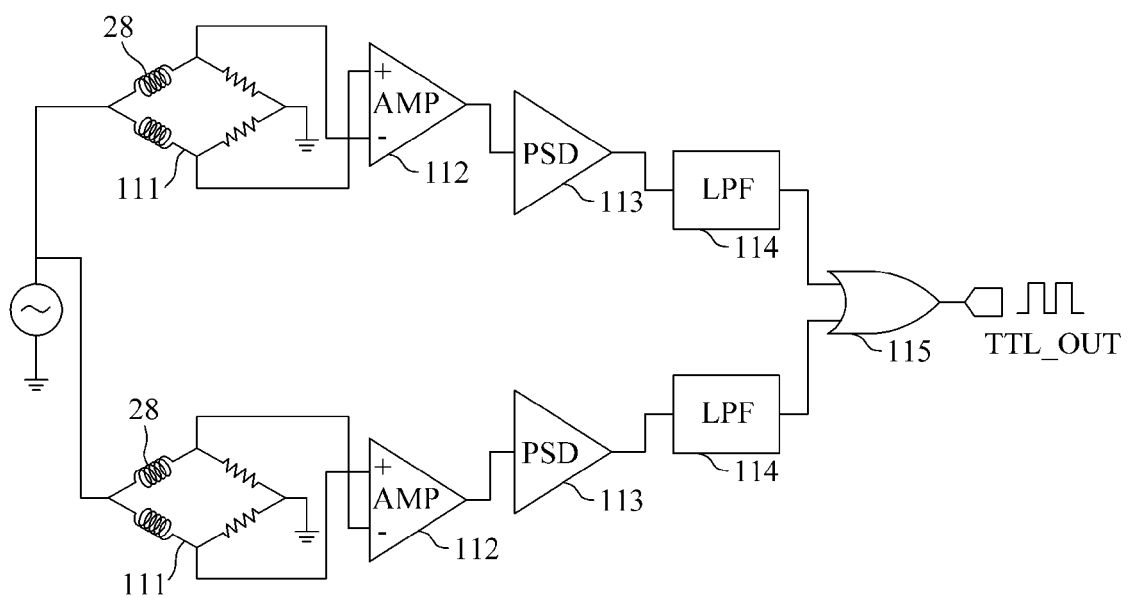
FIG. 4 is a circuit configuration diagram illustrating a detector included in a muzzle velocity measuring apparatus according to an exemplary embodiment of the present invention and FIG. 5 is a flow chart illustrating a method for measuring a muzzle velocity according to an exemplary embodiment of the present invention.

FIG. 4 is a circuit configuration diagram illustrating a detector included in a muzzle velocity measuring apparatus according to an exemplary embodiment of the present invention. The detector 110 will be described in detail with reference to FIGS. 2 to 4.

As illustrated in FIG. 2, the detector 110 includes a pair of eddy current sensors 26, and the pair of eddy current sensors 26 may consist of a first eddy current sensor and a second eddy current sensor. The first eddy current sensor senses a fired bullet passing the adapter 20 to thereby generate an eddy current signal, and the second eddy current sensor is installed to be spaced apart from the first eddy current sensor at a predetermined interval.

Referring to FIG. 4, the detector 110 may include a pair of bridge circuit 111, each bridge circuit 111 including a probe wound coil 28, a pair of differential amplifiers 112, a pair of phase sensitive detectors 113, a pair of low pass filters 114, and an OR gate 115.

The upper part of FIG. 4 may be a circuit configuration of the first eddy current sensor between a pair of eddy current sensors 26, which senses a fired bullet 10 and generates a first eddy current signal, and the lower part of FIG. 4 may be a circuit configuration of the second eddy current sensor between a pair of eddy current sensors 26, which senses the bullet 10 passing the first eddy current sensor and generates a second eddy current signal.

If a bullet 10 fired from a bullet chamber passes through the first eddy current sensor, the probe wound coil 28 of the bridge circuit 111 shown in the upper part of FIG. 4 generates a first eddy current signal and outputs the generated first eddy current signal to the differential amplifier 112. The differential amplifier 112 amplifies the received eddy current signal and outputs the amplified eddy current signal to the phase sensitive detector 113. The phase sensitive detector 113 removes noise from the amplified eddy current signal received from the differential amplifier 112 to thereby output a direct current signal. The direct current signal passes through the low pass filter 114 to thereby be output as a low frequency band signal without noise. The output signal passes through the OR gate 115 to thereby be output as a muzzle velocity signal (TTL_OUT).

Then, when the bullet 10 passes through the second eddy current sensor at a predetermined time after passing through the first eddy current signal, the probe wound coil 28 of the bridge circuit 111 shown in the lower part of FIG. 4 generates a second eddy current signal and outputs the generated second eddy current signal to the differential amplifier 112. The differential amplifier 112 amplifies the received eddy current signal and outputs the amplified eddy current signal to the phase sensitive detector 113. The phase sensitive detector 113 removes noise from the amplified eddy current signal received from the differential amplifier 112 to thereby output a direct current signal. The direct current signal passes through the low pass filter 114 to thereby be output as a low frequency band signal without noise, and the output signal passes through the OR gate 115 to thereby be output as a muzzle velocity signal (TTL_OUT).

Figure 5:
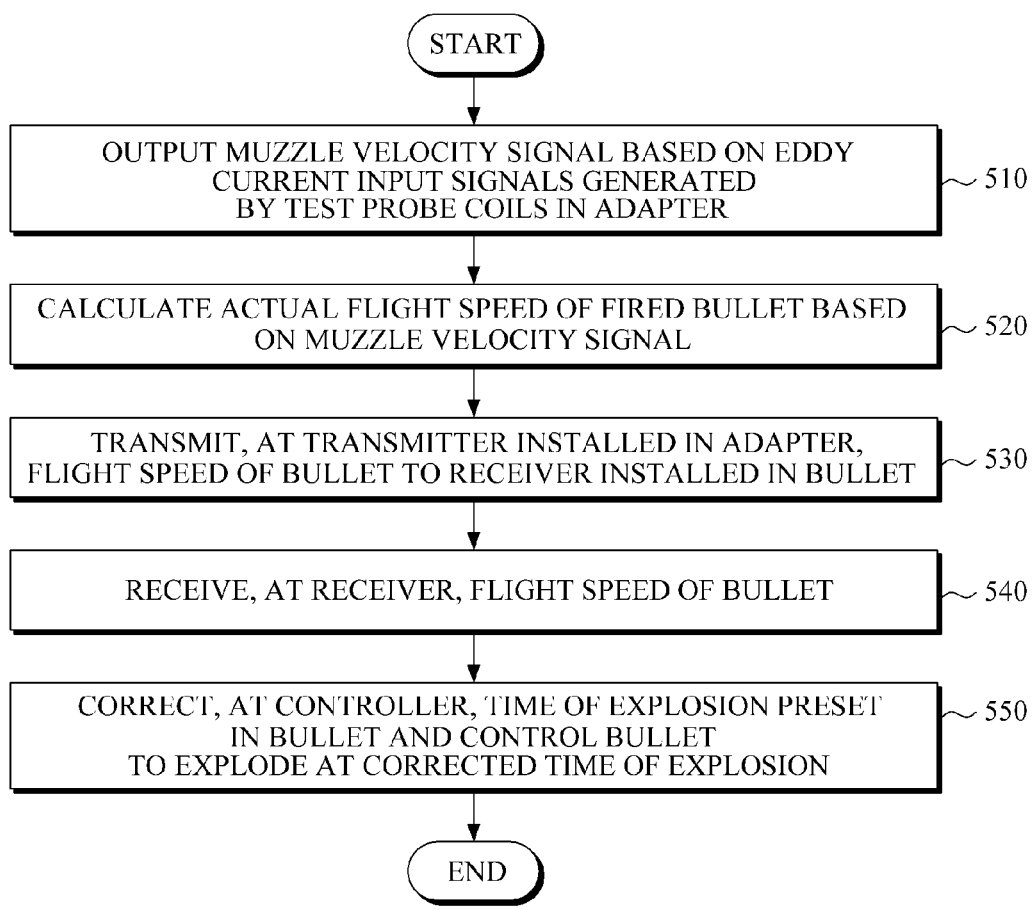

FIG. 5 is a flow chart illustrating a method for measuring a muzzle velocity according to an exemplary embodiment of the present invention.

With reference to FIGS. 2, 3 and 5, a method is provided for calculating an actual flight speed of a bullet 10 fired from a bullet chamber in the muzzle velocity measuring apparatus 100 according to an exemplary embodiment of the present invention.

When the fired bullet 10 passes through the adapter 20, the detector 110 generates a muzzle velocity signal based on eddy current signals which are generated by the probe wound coils 28 individually encircling two cores 26 installed in two separate positions in the adapter 20 in 510.

As shown in FIG. 2, the core 27 may be formed in a U-shape and may be installed in the adapter 20 to have the open side of the U-shape to face the inside of the adapter 20. Due to this configuration, it is possible to minimize the effect of metal outside of the adapter 20. In addition, the core 27 may be an Mn—Zn ferrite core.

The following are detailed descriptions about operation 510 of outputting a muzzle velocity signal by the detector 110. As described above with reference to FIG. 4, when a fired bullet 10 passes through the first eddy current sensor and the second eddy current sensor sequentially, a first eddy current signal is generated through the circuit configuration shown in the upper part of FIG. 4, and the first eddy current signal, eventually removed from noise, passes through the OR gate 115 to thereby be output as a muzzle velocity signal (TTL_OUT). Then, a second eddy current signal is generated through the circuit diagram shown in the lower part of FIG. 4, and the second eddy current signal, eventually removed from noise, passes through the OR gate 115 to thereby be output as a muzzle velocity signal (TTL_OUT).

Then, if the muzzle velocity signal is output, the muzzle velocity calculator 120 calculates an actual flight speed of the fired bullet 10 based on the muzzle velocity signal in 520, Then, when the actual flight speed of the bullet 10 is calculated, the transmitter 130 transmits the calculated flight speed to the flying bullet 10 in 530.

Then, the receiver 140 included in the flying bullet 10 receives the actual flight speed of the bullet 10 from the transmitter 130 in 540.

If the actual flight speed is received, the controller 150 corrects a time of explosion preset by a user, and controls the bullet 10 to explode at the accurate location of a target, based on the actual flight speed, in 550.

That is, a flight sped of the bullet 10 may be slightly changed according to various circumstances, for example, a manufacturing environment and a firing environment. Thus, even though a user sets a time of explosion of the bullet 10 based on an accurate distance between a bullet chamber and a target, it is changeable to control the bullet 10 to explode at the accurate location over the target. However, according to the above-described exemplary embodiments of the present invention, it is possible to control the bullet 10 to explode at the accurate location of a target by correcting a preset time of explosion based on an actual flight speed of the bullet 10 fired from a bullet chamber.

By measuring an actual flight speed of a fired bullet using eddy current input signals which are generated by eddy current sensors installed in a barrel, it is possible to correct a time of explosion of the bullet so that the bullet may explode at an accurate location of a target.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A muzzle velocity measuring apparatus comprising a detector configured to include a pair of cores, each of the pair of cores encircled by a probe wound coil and installed in two separate positions in an adapter, and to output a muzzle velocity signal based on eddy current signals generated by the probe wound coils when a bullet fired from a bullet chamber passes through the adapter; a muzzle velocity calculator configured to calculate a flight speed of the fired bullet based on the muzzle velocity signal; and a transmitter configured to transmit the calculated flight speed to the bullet, wherein the detector comprises a pair of bridge circuits, each of the bridge circuits includes one of the probe wound coils and generates a respective one of the eddy current signals, a pair of differential amplifiers, each of the differential amplifiers connected to a respective one of the bridge circuits and amplifies a respective one of the eddy current signals, a pair of phase sensitive detectors, each of the phase sensitive detectors connected to a respective one of the differential amplifiers and removes noise from a respective one of the amplified eddy current signals and outputs a respective phase sensitive detector signal, a pair of low pass filters, each of the low pass filters connected to a respective one of the phase sensitive detectors and receiving a respective one of the phase sensitive detector signals and outputting a respective low frequency band signal, and an OR gate connected to the pair of low pass filters and receiving the low frequency band signals and outputting the muzzle velocity signal.

2. The muzzle velocity measuring apparatus of claim 1, wherein each of the cores is formed in a U-shape, and is installed in the adapter such that an open side of the U-shape faces an inner side of the adapter.

3. The muzzle velocity measuring apparatus of claim 2, wherein the cores comprise Mn—Zn ferrite.

4. The muzzle velocity measuring apparatus of claim 1, further comprising:
a receiver installed in the bullet, and configured to receive the calculated flight speed of the bullet from the transmitter; and
a controller installed in the bullet, and configured to control the bullet, based on the received flight speed, to explode over a target.

5. The muzzle velocity measuring apparatus of claim 4, wherein the controller comprises a memory configured to store a time of explosion set by a user; and
wherein when the receiver receives the calculated flight speed of the bullet from the transmitter, the controller is configured to correct the time of explosion stored in the memory based on the calculated flight speed, such that the bullet explodes based on the corrected time of explosion.

* * * * *